US009535613B2

(12) United States Patent
Yazdani et al.

(10) Patent No.: US 9,535,613 B2
(45) Date of Patent: Jan. 3, 2017

(54) HARDWARE AND SOFTWARE METHODOLOGIES FOR DETECTING ILLEGAL MEMORY ADDRESS OF A MEMORY ACCESS OPERATION

(71) Applicant: Futurewei Technologies, Inc., Plano, TX (US)

(72) Inventors: Reza Yazdani, Los Altos, CA (US); Chen Tian, Union City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 220 days.

(21) Appl. No.: 14/551,915

(22) Filed: Nov. 24, 2014

(65) Prior Publication Data

US 2016/0147466 A1    May 26, 2016

(51) Int. Cl.
*G06F 12/00* (2006.01)
*G06F 3/06* (2006.01)
*G06F 12/02* (2006.01)

(52) U.S. Cl.
CPC ........... *G06F 3/0614* (2013.01); *G06F 3/0653* (2013.01); *G06F 3/0673* (2013.01); *G06F 12/0292* (2013.01)

(58) Field of Classification Search
None
See application file for complete search history.

(56) References Cited

U.S. PATENT DOCUMENTS

2008/0288737 A1* 11/2008 Zhuang ................... G06F 8/441
711/165

* cited by examiner

*Primary Examiner* — Brian Peugh
(74) *Attorney, Agent, or Firm* — Schwegman Lundberg & Woessner, P.A.

(57) ABSTRACT

A system for providing bound checking to insure memory accessed, including indirect object access through pointers, is within a range of defined object bounds is disclosed herein. Embodiments of the present disclosure provide hardware and software methodology for bound checking, where bound checking is performed in hardware and in parallel with the execution of the memory accesses using dedicated hardware. There is reduced overhead associated with the enforcement of bound checking, and hardware is modified to include new registers and/or instructions for bound checking support. An exception is raised when an out of bound violation is detected. According to some embodiments, a compiler extracts bound information from the respective programming language (e.g. C/C++, Java) and generates tables with special APIs known to the hardware that enables both execution of the program and bound checking to be performed simultaneously.

20 Claims, 6 Drawing Sheets

HARDWARE AND SOFTWARE METHODOLOGIES FOR DETECTING ILLEGAL MEMORY ADDRESS OF A MEMORY ACCESS OPERATION

FIELD

Embodiments of the present invention generally relate to the field of computer programming. More specifically, embodiments of the present invention relate to methodologies for detecting illegal memory access during program execution.

BACKGROUND

Accessing or modifying data outside of an allocated address space is a well-known problem in programming languages. An unintended memory reference can cause faults, data corruption or breaches in the security of an entire system, potentially causing substantial damage to the system and the underlying data. Memory references that occur outside of an allocated memory space may render software unreliable, and these errors may be difficult to detect in many cases.

Programming languages such as Java, for example, implement secure memory access methodologies in programming semantics. In Java, every memory access is guaranteed to be safe and within the range of addresses as intended by the programmer. However, Java does not support the use of pointers to objects; therefore it is much easier to enforce data access security in Java when compared to languages such as C/C++, for example, that do support the use of pointers. In C/C++, knowledge regarding bounds to which a pointer to an object can point is lost, and it is almost impossible to identify and test for potential illegal memory accesses at run time when the data is accessed.

Conventionally, memory accesses bound checking is usually performed in software. A compiler generates bound checking code and memory address checking is performed at runtime. An error is issued if an out of bound memory addresses is detected. However, this process substantially degrades performance of the code being executed because a substantial amount of checking is involved. Special compiler optimizations have been developed to move bound checks out of loops, for example, to code segments that are less frequently executed.

Some specialized hardware, such as employed by certain types of Intel processors, for example, support software bound checking libraries (e.g. Intel Parallel Studio XE 2013) to improve the performance of bound checking operations. Generally, a compiler generates code and prepares bound checking data for the new hardware memory instructions. These machines execute bound checking code in parallel with the execution of the rest of the code using different cores. However, pointers are excluded in these systems, as mentioned above. Better bound checking is needed.

SUMMARY

An approach to providing bound checking to insure memory access, including indirect object access through pointers, is within a range of defined object bounds is disclosed herein. Embodiments of the present disclosure provide hardware and software methodologies for bound checking, where bound checking is performed in parallel with the execution of the memory accesses using dedicated hardware. There is reduced overhead associated with the enforcement of the proposed bound checking approach, and hardware may be modified to include new registers and/or instructions for bound checking support. An exception is raised in the case of an out-of-bound violation being detected. According to some embodiments, a compiler extracts bound information from the respective programming language (e.g. C/C++, Java) and generates tables with special APIs known to the hardware that enable execution of both the program and memory access bound checking to be performed simultaneously, while the rest of the program executes.

According to some described embodiments, an apparatus for detecting an illegal memory access by a software function is disclosed. The apparatus includes a register for storing a reference to a base address of a map table, where the map table includes an object address and a size value of a memory operation of the software function, where a legal memory range for the memory operation is computed based on the object address and the size value. The apparatus also includes a cache for storing the map table and a processor including an object construction module for generating a value pair comprising a first value and a second value for a declared pointer within the software function, where the first value includes a current address of a memory operation of the software function, the second value including a reference to the object address and the size value of the map table, and where the declared pointer is initialized with a memory address of the value pair. The processor performs bound checking based on the legal memory range and the current address, and signals an interrupt responsive to a memory address being outside of the legal memory range.

According to other embodiments, a method is disclosed for detecting an illegal memory access by a software function. The method includes storing a reference to a base address of a map table in a register, storing the map table in a cache, where the map table comprises an object address and a size value of a memory operation of the software function, where a legal memory range for the memory operation is computed based on the object address and the size value. A value pair comprising a first value and a second value for a declared pointer within the software function is generated, where the first value includes a current address of a memory operation of the software function, the second value includes a reference to the object address and the size value of the map table, and where the declared pointer is initialized with a memory address of the value pair. Bound checking is performed based on the legal memory range and the current address, and an interrupt is signaled responsive to a memory address being outside of the legal memory range.

According to other embodiments, a method for detecting an illegal memory access by a pointer of a software function is disclosed. The method includes loading a pair of values pointed to by the pointer, the pair of values including a first address and a second address. An upper address limit is determined by loading an ID value of a map table indicated by the second address and adding the ID value to a base address of a map table. A lower address limit is determined based on the first address, and content of a memory location pointed to by the first address is retrieved. Responsive to the first address being between the lower address limit and the upper address limit, the content is assigned to an object associated with the first address. Responsive to the first address being outside of the lower address limit and the upper address limit, an error and/or an interrupt is signaled.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Hardware and Software Memory Access Methodologies or Address Bound Checking

In the following embodiments, hardware and software methodologies for providing memory access bound checking are provided to insure memory accesses (including indirect object accesses through pointers) are maintained within the range of predefined object bounds defined by the programmer. According to embodiments of the present invention, bound checking is performed in parallel with execution of memory accesses by dedicated hardware. Therefore, overhead associated with address range enforcement in the proposed system is reduced, and hardware is modified to comprise a new class of registers and instructions for bound checking support. These instructions are used to perform bound checking in parallel with the execution of memory access instructions. It is appreciated that an exception is raised when an out of bound violation is detected.

A compiler is an instrument used to provide automated bound checking. According to embodiments of the present invention, a compiler extracts bound information from a respective programming language (e.g. C/C++, Java) and automatically generates tables with special application programming interfaces (APIs) known to the hardware that enable the hardware to execute a program and simultaneously (e.g., in parallel) determine if a memory access is legal while the program executes.

Figure 1A:
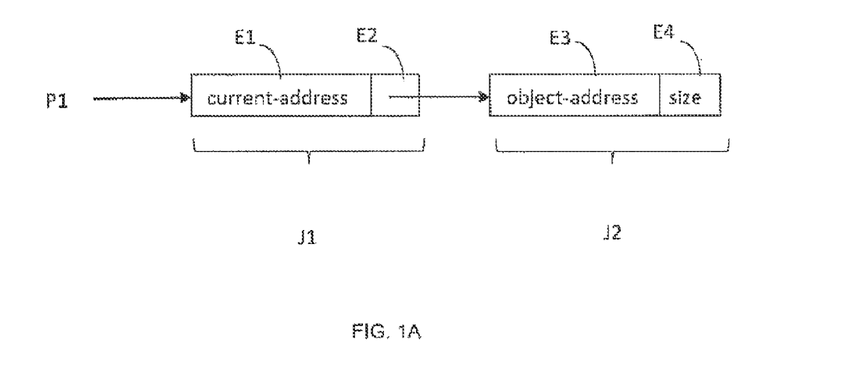
FIG. 1A is a diagram illustrating an exemplary safe pointer to a safe object, where the safe object references an exemplary table entry, according to embodiments of the present invention.

With regard to FIG. 1A, an exemplary safe pointer to an object is depicted in a diagram according to embodiments of the present invention. As disclosed herein, a pointer is a safe pointer if the pointer cannot be dereferenced to access a memory address outside of the bounds of the object to which it points. Safe pointers are initialized either to NULL or to an address of an object. An assignment to a safe pointer can be an address of an object or an assignment of another safe pointer. Furthermore, as disclosed herein, an object is a safe object if access to that object is performed using only safe pointers. An object or a pointer is not a safe pointer or object (e.g., an unsafe object or pointer) if it is not compiled by a compiler that generates safe code. Safe code is code that, when executed, does not attempt to perform illegal memory accesses.

In the following discussion, all objects and pointers discussed are considered to be safe objects and safe pointers. Safe and unsafe pointers may coexist in an executable; however, according to the methodologies disclosed herein, it is illegal to assign an unsafe pointer to a safe pointer (however, assignment of safe pointers to unsafe pointers is legal).

Still with regard to FIG. 1A, pointer P1, as depicted, indirectly points to an object J1 that comprises two elements. A first element E1 indicates the address of a target object of P1, and a second element E2 points to an object (e.g., a map table entry) J2. Entry J2 comprises a first element E3 that indicates a starting address of the target object, and a second element E4 that indicates a size of the target object in bytes.

Figure 1B:
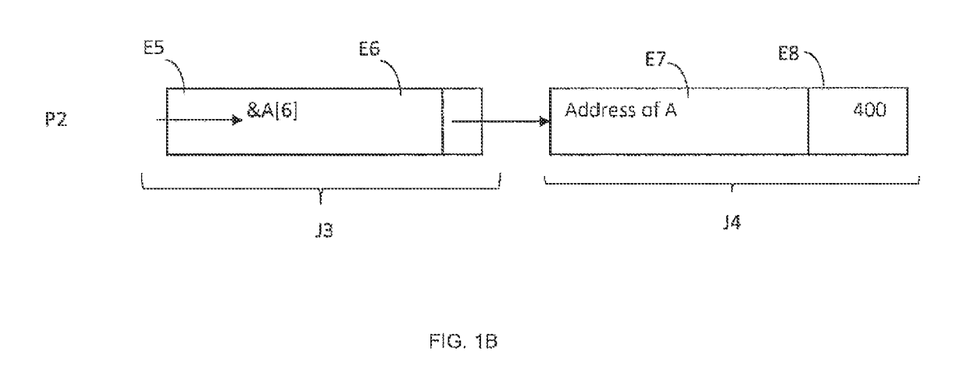
FIG. 1B is a diagram illustrating an exemplary safe pointer to a safe object having exemplary values defined in Table 1, according to embodiments of the present invention.

As depicted in FIG. 1B, an exemplary object A and exemplary pointer P are defined using the instructions of Table 1. Pointer P2 points to an address of a memory location (J3) that has a pair of values: the address of A[6], e.g., "current-address" (E5), and a pointer (E6) to another object/table entry (J4) that has the address of A[0], e.g., "object-address" (E7), and its size (E8), which is 400 bytes. Pointer P2 is a safe pointer because it cannot be dereferenced to access a memory address outside of the bounds of the object to which it points and is initialized either to an address of an object (e.g., object J3). Also, object J3 is a safe object because object J3 is accessed using only safe pointers.

TABLE 1

```
int A[100];
safe int *P2 = &A[6];
```

Compiler and Loader Implementations

According to embodiments of the present invention, a compiler and a loader are used to produce unique Address-Size data pairs, referred to as 'address-size pair' in predefined tables used by the hardware. When an object is declared or created in the program, an entry is created in a predefined table. The scope of an object is either local or global. The scope of a global object comprises the entire program. Local-scope-objects are declared within a function body. The life-time of a Local-scope-object ends when the function returns to its caller.

A global map is a table created and initialized by a loader, and contains an address-size pair for the globally scoped objects in the program. An offset value (e.g., an ID) in a global map indicates where information about the object is located and may be used to identify that object. Offset values/IDs are used by the hardware memory operations to verify the legality of memory accesses at runtime.

A local map is a table created by a compiler at runtime for local variables. A local map is created for local objects, and the structure of a local map is similar to the structure of a global map. A local map is allocated on a stack frame of a function and initialized upon entry of the function. A local map contains information about objects declared within the function body. A compiler generates code in the function to create and initialize a local map. An offset value (e.g., an ID) of a local map indicates where information about an object is stored and may be used to identify the object.

Figure 2:
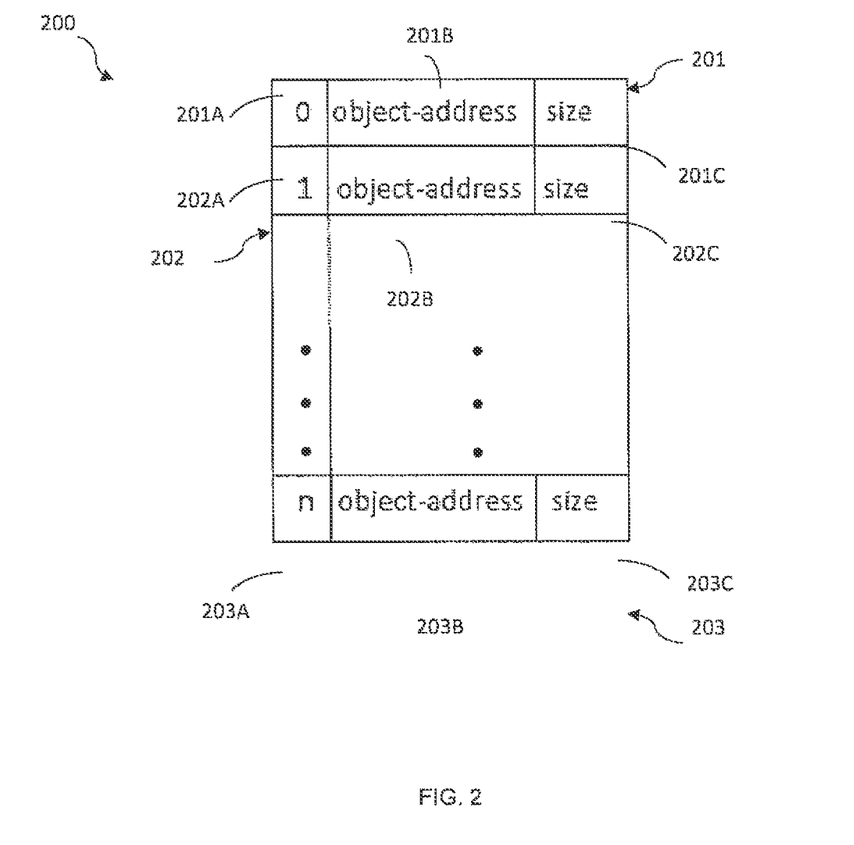
FIG. 2 is a diagram illustrating an exemplary map table having 'n' table entries according to embodiments of the present invention.

With regard to FIG. 2, an exemplary memory resident map table 200 is depicted according to embodiments of the present invention and comprises a local map table or a global map table. As depicted, 'n' is a variable that represents the total number of entries in map table 200. A first table entry 201 comprises an ID/offset value 201A of '0', an object-address value 201B, and a size value 201C. As described above, an object-address value indicates the location of the beginning of an object in memory. A size value of an entry in a local or global map table indicates a size of an object in bytes. A second table entry 202 comprises an ID value 202A of '1', an object-address value 202B, and a size value 202C. The table contains other entries (e.g., ID 2, ID 3 . . . ID n−1) that are not depicted in FIG. 2. A final table entry having an ID value 203A of entry 'n' comprises an object-address value 203B and a size value 203C.

A constructor of an object (e.g., object construction module 107) containing a pointer creates an address-address pair value for the pointers declared within the object and initializes the pointer with an address of the pair. In other words, a pointer points to the address-address pair the object created. The two addresses in the address-address pair, are set to zero for an uninitialized pointer or a pointer initialized to NULL. For an initialized pointer, the first address in the pair is the address of the target and the second address is an ID of the assigned object. Note that an ID is the offset of a map table (e.g., a local or global map). It is appreciated that to determine an address of the object information, the ID is added to the base address of the corresponding map. For example, where pointer P=&B[i], an address-address pair for pointer P is created by the constructor of P and contains an address of B[i] and an ID of object B in a map table. Where pointer P=Q, assignment of the address in pointer Q is moved to P. In other words, the address-address pair of Q is assigned to P.

Figure 3A:
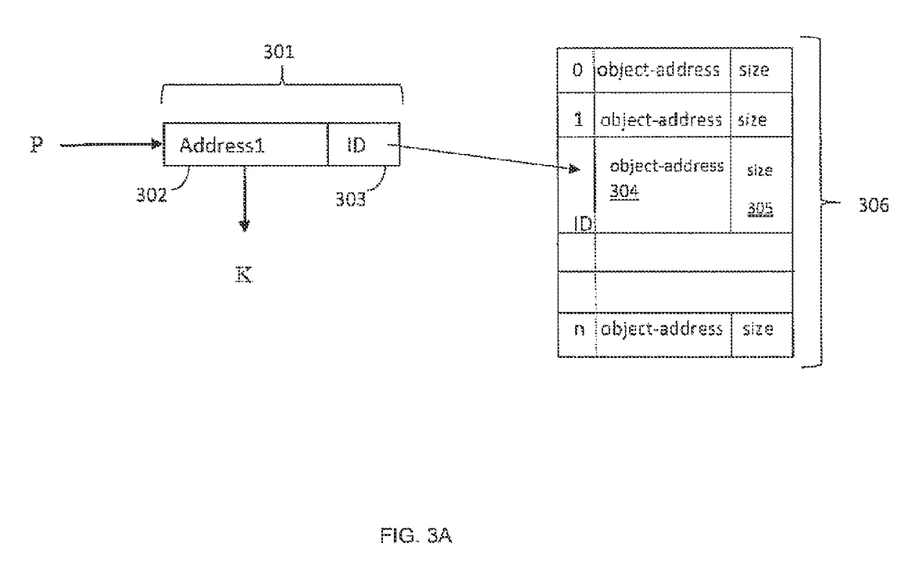
FIG. 3A is a diagram illustrating an exemplary safe pointer to a safe object, where the safe object references an exemplary table entry of an exemplary table having 'n' entries, according to embodiments of the present invention.

With regard to FIG. 3A, an exemplary map table 306 for performing bound checking is depicted according to embodiments of the present invention. In the example of FIG. 3A, K=*P.

Figure 3B:
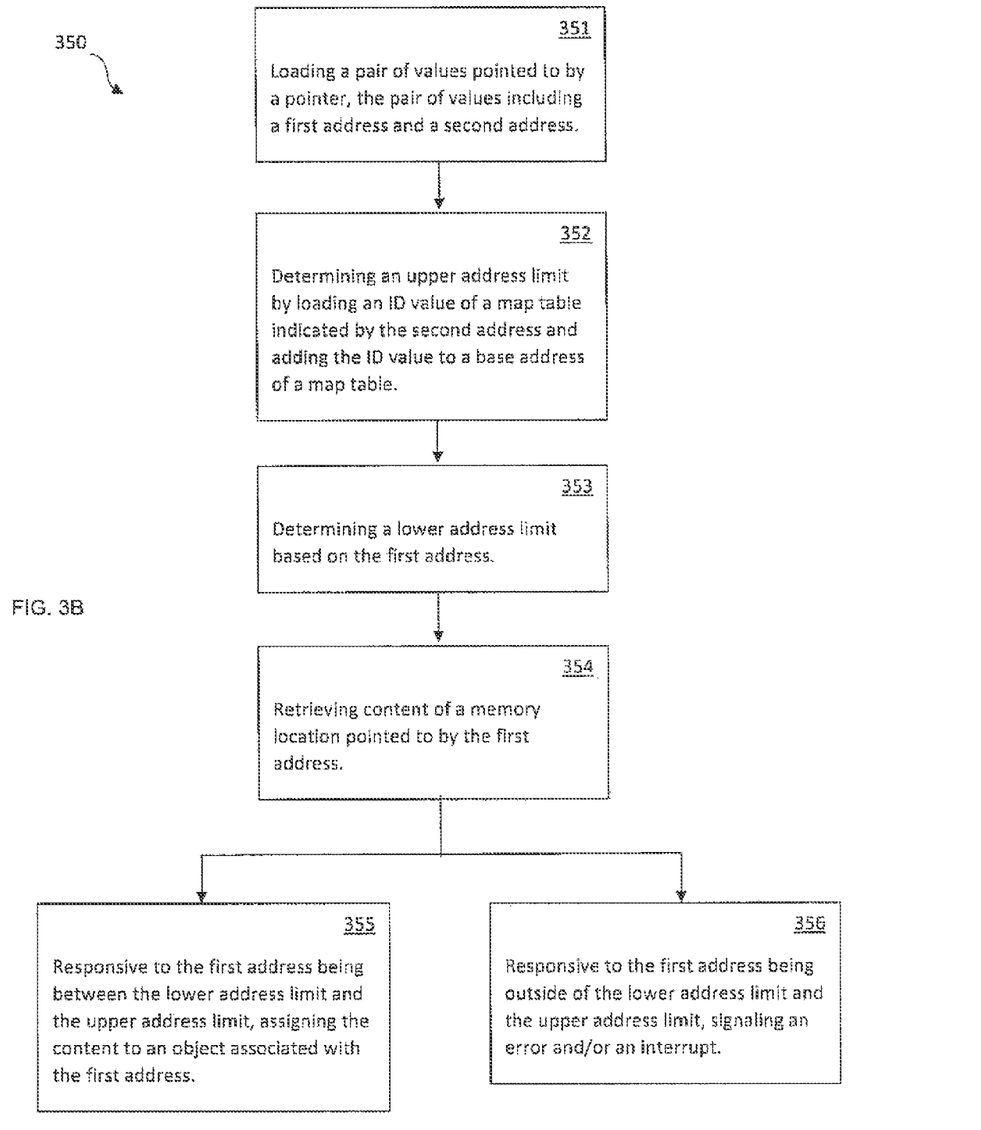
FIG. 3B is a flowchart illustrating an exemplary method comprising a sequence of computer implemented steps for performing bound checking for a pointer of a software function according to embodiments of the present invention.

An exemplary method comprising a sequence of computer implemented steps for performing bound checking is depicted by flowchart 350 of FIG. 3B, according to embodiments of the present invention. The following references FIGS. 3A and 3B simultaneously. A hardware unit (e.g., processor 101 and/or RAM 102) of the computer system loads pointer P, which points to address-address pair 301 (Step 351). A hardware unit (e.g., processor 101 and/or RAM 102) determines if address 302 of the pair is within a range of legal addresses by determining a base of a legal address by loading the ID value indicated by address 303 (Step 352). The ID/offset value (e.g., address 303) is added to the base address (e.g. address 304) of the corresponding map table (e.g., map table 306) to produce an address upper limit (Step 353). An address lower limit is determined based on the address of the object pointed to by address 302 (Step 354).

Hardware simultaneously loads address 302 and retrieves the content (e.g., data) of the memory pointed to by the address 302. If the address 302 is in a legal range, the values loaded are assigned to K (step 355). Otherwise, if address 302−address 304>=size 305, an out-of-bound object access interrupt is signaled (step 356).

According to some embodiments of the present invention, dynamically allocated objects are considered global in scope. For example, a memory allocation function (e.g. malloc) allocates an object on a heap at address X. The memory allocator function creates an entry E, in a global map table and saves address X and the allocated size of the object in entry E. The address-address pair for the allocated space is returned to the caller. Management and optimization of the entries created in the global map by the memory allocator are performed by the memory allocator. This process is very similar to the allocation of address-address pairs for local variables. However, in this case, a global map entry is released when the object is destroyed. In the other cases, local map table entries may be destroyed when the function returns.

Hardware for Detecting Illegal Memory Access

Figure 4:
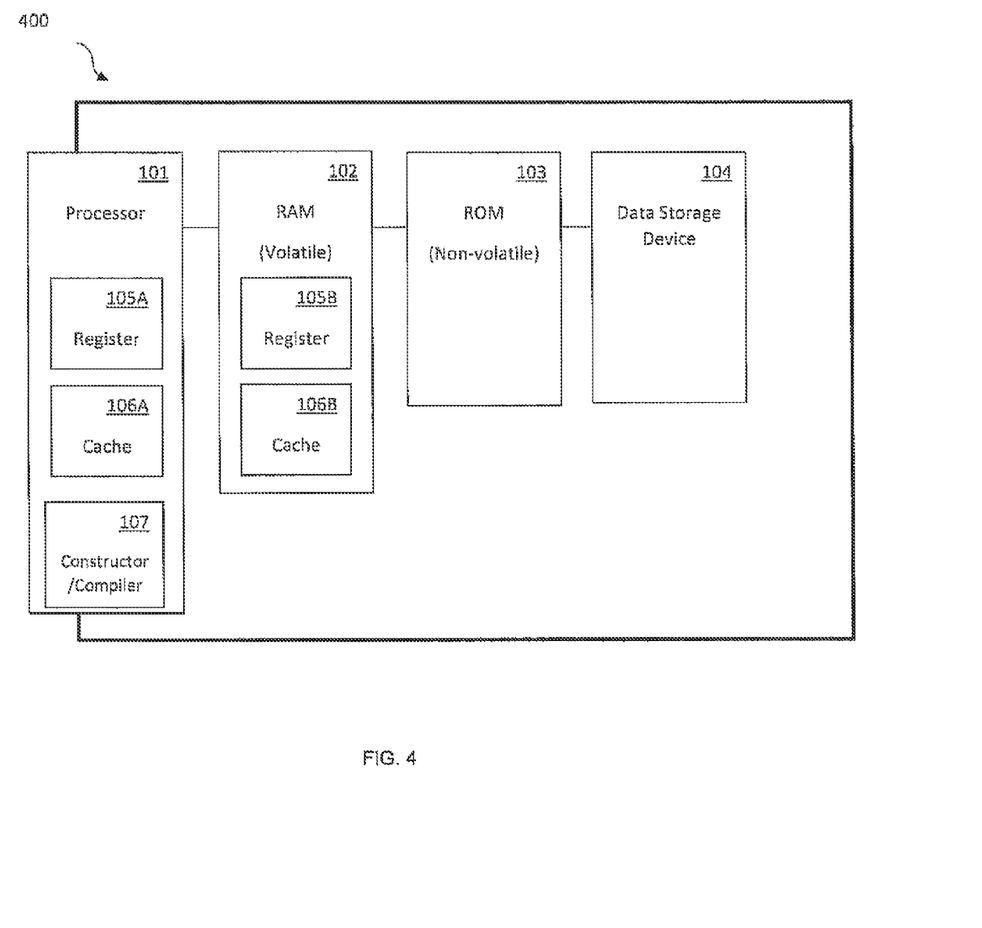
FIG. 4 is a diagram illustrating an exemplary computer system for detecting illegal memory accesses, the computer system having a special register and a dedicated cache, according to embodiments of the present invention.

With regard to FIG. 4, an exemplary computer system 400 for performing bound checking is depicted according to embodiments of the present invention. According to some embodiments, a hardware unit (e.g., processor 101 or RAM 102) comprises a special register (e.g., register 105A or 105B) for pointing to the base address of the global map table. A hardware unit (e.g., processor 101 and/or RAM 102) also comprises a dedicated cache (e.g., cache 106A or 106B) for holding IDs/offsets and/or memory bounds.

Memory instructions comprising an identifier are used by the hardware unit to identify an ID/offset for bound checking purposes. The indicator identifying the ID may comprise a register, an immediate field, or part of a 64-bit memory address when bits are available. For example, for computer systems comprising a 64-bit processor, an address is usually 48-bits and 16-bits are available for other use. Data storage device 104 may be used to store data that is accessed infrequently or to provide redundant storage in case of failure of a memory component (e.g., RAM 102 or ROM 103), and ROM 103 provides non-volatile data storage. Processor 101 is communicatively coupled with RAM 102, for example, to load and execute instructions, as well as to store results output by processor 101. A constructor of an object (e.g., object construction module 107) containing a pointer creates an address-address pair value for the pointers declared within the object and initializes the pointer with an address of the pair. Object construction module 107 may comprise a compiler module for generating code and preparing bound checking data for new hardware memory instructions.

According to some embodiments of the present invention, a dedicated cache (e.g., cache 106A or 106B) is used to maintain an ID table for storing ID/offset values. According to some embodiments of the present invention, additionally circuitry configured to flag out-of-bound memory references is provided.

Figure 5:
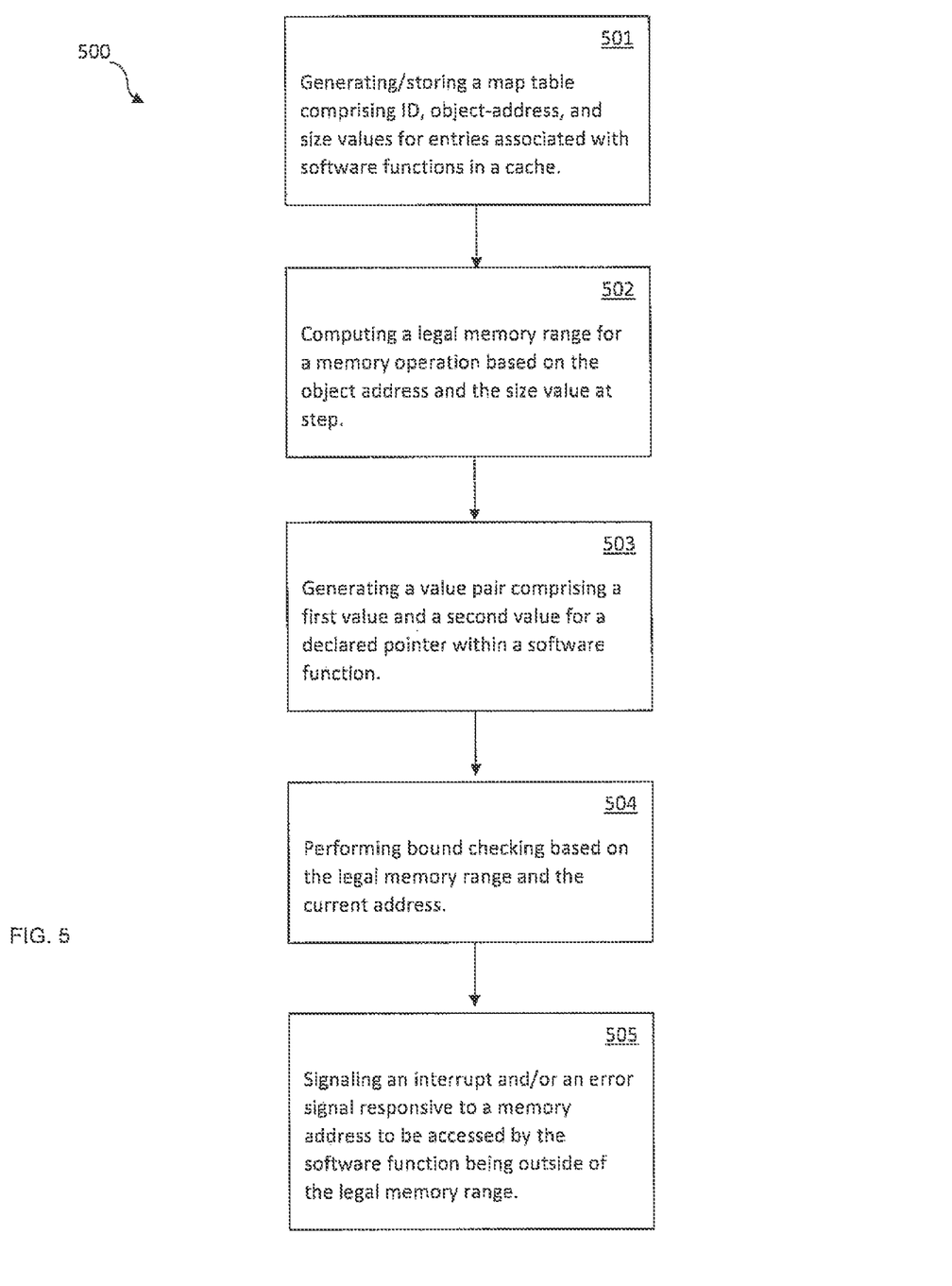
FIG. 5 is a flowchart illustrating an exemplary method comprising a sequence of computer implemented processes for performing bound checking for a software function according to embodiments of the present invention.

With reference to FIG. 5, a flowchart 500 illustrating an exemplary process comprising a sequence of computer implemented steps for performing bound checking for a software function is depicted, according to embodiments of the present invention. At step 501, the process begins by generating and/or storing a map table (e.g., a local map table or a global map table) in memory, the table comprising an ID, an object address, and a size value for entries associated with software functions in a cache (e.g., cache 105A or cache 105B). A legal memory range for a memory operation is computed based on the object address and the size value at step 502. A value pair comprising a first value and a second value is generated for a declared pointer within a software function at step 503. The first value comprises a current address of a memory operation of the software function and the second value comprises a reference to the object address and the size value of the map table. When a pointer is declared, it is initialized with a memory address of the value pair. At step 504, bound checking is performed based on the legal memory range and the current address. At step 505, an interrupt and/or an error signal is signaled responsive to a memory address (to be accessed by the software function) being outside of the legal memory range.

Bound Checking Examples for Exemplary Memory Operations

When a memory operation is executed, a dedicated cache comprising an ID of the memory operation is accessed. Memory bound information may be obtained simultaneously with the memory accesses. A memory address pointed to by a pointer is safe if the memory address falls within a specified range defined by the ID. In the case of a violation, an interrupt signal is generated which is handled by the interrupt handler. Safe memory access instructions have a field for the ID of the object referenced. The ID field indicates an offset of an associated global or local map table. The ID field may comprise an immediate (e.g., a constant value) and/or may be in a register (e.g., Register 105A and 105B). According to some embodiments of the present invention, an ID field resident in a register enables pointer-based access and large IDs that do not fit in an immediate field of a memory instruction. According to some embodiments of the present invention, a register (e.g., register 105A or 105B) is used to maintain an address of a global map table.

In one example, a 64-bit load and check instruction LDC is be defined as:

[LDC r1, r2, ID]

This instruction may be used to load objects. The instruction loads the value at the address register r2 into the register r1. ID is an immediate field which represents an offset of the object being loaded in a global or local map table. The instruction loads the global map entry located at the offset/ID, and a hardware unit (e.g., a processor and/or memory) simultaneously loads the 64-bit value at the address in register r2 while checking if r2 is in a legal range of addresses of the object represented by the ID. For example, the instruction checks if register r2 is in the legal range where:

r2>=global map[ID].object-address && (r2+8)<global map[ID].object-address+global map[ID].size If the load is legal, the 64-bit value at the address in register r2 is already loaded and will be moved to the register r1. It is appreciated that an exception is raised if an out of bound memory access is detected.

As another example, the following instruction stores data into a safe object:

[SDC r1, r2, ID].

The instruction loads the global map entry located at the offset ID. The instruction checks if the address in register r2 is in the legal range, where:

r2>=global map[ID].object-address && (r2+8)<global map[ID].object-address+global map[ID].size If the address is legal, the 64-bit value in the register r1 is stored at the address in register r2. Otherwise, an illegal memory access is detected and an exception is raised.

As another example, where *P=*(Q+m), a compiler generates the exemplary code depicted in Table 2. Instruction LDA loads a target address in the address-address pair and adds it to r2*8. The result is stored in register r3. A hardware unit (e.g., a processor and/or memory) determines in parallel if the computed address is within the range of the object pointed to by Q as specified in register r1 (e.g., Q->Real-address+m*8). The hardware raises an exception if any of the bytes to be loaded are outside of an address space of the target object. Instruction STA stores the value in register r3 into the target address of pointer P, retrieves the address-address pair from register r4, and retrieves the target address and its corresponding map. Bound checking is performed as described above, and the value in register r3 is stored if the address is determined to be legal.

TABLE 2

```
r1 = Q // (address-address pair)
r2 = m
r4 = P
LDA  r3, r1, r2  // r3 = *(Q-> Real-address +m* 8)
STA  r3, r4, 0
```

As another example, an address is stored in register r2 and a value is stored in register r1. A series of load-check and store-check instructions are performed according to Table 3. Vector or other instructions may be performed in a similar manner.

TABLE 3

| LDC  | r1, r2, ID | // Load-check; ID is immediate |
| LDC | r1, r2, ID | // Load-check; ID is immediate |
| SDC | r1, r2, ID | // Store-check; ID is immediate |
| LDA | r1, r2 | // Load-check, ID is embedded in register r2 |
| SDA | r1, r2 | // Store-check, ID is embedded in register r2 |
| LDCR | r1, r2, r3 | // Load-check, ID is in register r3 |
| SDCR | r1, r2, r3 | // Store-check, ID is in register r3 |

Embodiments of the present invention are thus described. While the present invention has been described in particular embodiments, it should be appreciated that the present invention should not be construed as limited by such embodiments, but rather construed according to the following claims.

What is claimed is:

1. An apparatus for detecting illegal memory access by a software function, comprising:
a register operable to store a reference to a base address of a map table, wherein the map table comprises an object address and a size value of a memory operation of the software function, wherein a legal memory range for the memory operation is computed based on the object address and the size value;
a cache operable to store the map table; and
a processor operable to execute a memory access involving a value pair comprising a first value and a second value for a declared pointer within the software function, wherein the first value comprises a current address of a memory operation, the second value comprises a reference to the object address and the size value of the map table, and wherein the declared pointer is initialized with a memory address of the value pair,
wherein the processor is further operable to perform bound checking based on the legal memory range and the current address, and to signal an interrupt responsive to a memory access being outside of the legal memory range.

2. The apparatus of claim 1, wherein the legal memory range is computed at runtime.

3. The apparatus of claim 1, wherein the processor is operable to perform the bound checking in parallel with the execution of the memory access.

4. The apparatus of claim 3, wherein the memory access comprises a vector instruction.

5. The apparatus of claim 1, wherein further the processor is operable to execute a compiler module executed by the processor for extracting bound information of a programming language.

6. The apparatus of claim 5 wherein the programming language comprises one of C/C++ and Java.

7. The apparatus of claim 5, wherein the second value comprises one of an immediate and a constant value.

8. The apparatus of claim 5, wherein the compiler module is operable to generate a table comprising application programming interfaces (APIs) that are compatible with the processor.

9. The apparatus of claim 1, wherein the map table comprises a local map table allocated on a stack frame of the software function and is operable to be initialized upon entry of the software function.

10. A method for detecting an illegal memory access of a software function, the method comprising:
storing a reference to a base address of a map table in a register;
storing the map table in a cache, wherein the map table comprises an object address and a size value of a memory operation, wherein a legal memory range for the memory operation is computed based on the object address and the size value;
generating a value pair comprising a first value and a second value for a declared pointer within the software function, wherein the first value comprises a current address of a memory operation, the second value comprises a reference to the object address and the size value of the map table, and wherein the declared pointer is initialized with a memory address of the value pair;
performing bound checking based on the legal memory range and the current address; and
signaling an interrupt responsive to a memory access involving an address outside of the legal memory range.

11. The method of claim 10 further comprising computing the legal memory range at runtime.

12. The method of claim 10 further comprising executing the memory operation and wherein the bound checking is performed by hardware in parallel with the executing the memory operation.

13. The method of claim 12, further comprising extracting bound information of a programming language by executing a compiler module.

14. The method of claim 13, wherein the programming language comprises one of C/C++ and Java.

15. The method of claim 13, wherein the second value comprises one of an immediate and a constant value.

16. The method of claim 13, further comprising the compiler module generating a table comprising application programming interfaces (APIs) that are compatible with a processor executing said bound checking and said memory operation.

17. The method of claim 12, wherein the memory operation comprises a vector instruction.

18. The method of claim 10, wherein the map table comprises a local map table allocated on a stack frame of the software function and further comprising initializing said map table upon entry of the software function.

19. A method for detecting an illegal memory access by a pointer of a software function, the method comprising:
loading a pair of values pointed to by the pointer, the pair of values comprising a first address and a second address;
determining an upper address limit by loading an identifier value of a map table indicated by the second address and adding the identifier value to a base address of a map table;

determining a lower address limit based on the first address;

retrieving content of a memory location pointed to by the first address;

responsive to the first address being between the lower address limit and the upper address limit, assigning the content to an object associated with the first address; and detecting that the first address is outside of the lower address limit and the upper address limit, and responsive thereto signaling an error and/or an interrupt.

20. The method of claim 19, wherein the map table comprises a local map table allocated on a stack frame of the software function, and wherein said detecting and said signaling are performed by a hardware unit.

* * * * *